United States Patent
Przestrzelski

(10) Patent No.: US 10,929,505 B1
(45) Date of Patent: Feb. 23, 2021

(54) METHOD AND SYSTEM FOR IMPLEMENTING HISTOGRAM-BASED ALARMS IN A PRODUCTION SYSTEM

(71) Applicant: EMC IP Holding Company LLC, Hopkinton, MA (US)

(72) Inventor: Piotr Przestrzelski, Rathcormac (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 361 days.

(21) Appl. No.: 15/924,939

(22) Filed: Mar. 19, 2018

(51) Int. Cl.
*G06F 17/18* (2006.01)
*G05B 19/4063* (2006.01)
*G06F 17/17* (2006.01)

(52) U.S. Cl.
CPC ......... *G06F 17/18* (2013.01); *G05B 19/4063* (2013.01); *G06F 17/17* (2013.01)

(58) Field of Classification Search
None
See application file for complete search history.

(56) References Cited

U.S. PATENT DOCUMENTS

| 10,332,030 B2* | 6/2019 | Agarwal | G06F 16/2228 |
| 2013/0282336 A1* | 10/2013 | Maeda | G05B 23/02 |
| | | | 702/184 |

OTHER PUBLICATIONS

Sudipto Guha, Nick Koudas, and Kyuseok Shim. 2001. Datastreams and histograms. In Proceedings of the thirty-third annual ACM symposium on Theory of computing (STOC '01). Association for Computing Machinery, New York, NY, USA, 471-475. DOI:https://doi.org/10.1145/380752.380841 (Year: 2001).*

Sudipto Guha, Piotr Indyk, S. Muthukrishnan, and Martin Strauss. 2002. Histogramming Data Streams with Fast Per-Item Processing. In Proceedings of the 29th International Colloquium on Automata, Languages and Programming (ICALP '02). Springer-Verlag, Berlin, Heidelberg, 681-692. (Year: 2002).*

Kumavat, Kavita, "Anomaly Extraction Using Histogram-Based Detector", International Journal on Recent and Innovation Trends in Computing and Communication, vol. 3 Issue: 1, Jan. 2015, (5 pages).

Kind, Andreas et al., "Histogram-based traffic anomaly detection", IEEE Transactions on Network and Service Management, Jul. 2009, (13 pages).

* cited by examiner

*Primary Examiner* — Roy Y Yi

(74) *Attorney, Agent, or Firm* — Chamberlain, Hrdlicka, White, Williams & Aughtry

(57) ABSTRACT

A method and system for implementing histogram-based alarms in a production system. Specifically, the method and system disclosed herein entail generating histograms overlaid with frequency (i.e., number of data samples) based class policies to serve as data classifiers for measurements, metrics, or information produced by physical and/or logical sensors. The accurateness of histograms to represent distributions of data, however, may depend on certain constraints—one of which may be the number of intervals or buckets employed. Therefore, disclosed herein is also a methodology for identifying an optimal number of buckets, for particular sensor specific datasets, based on a maximum samples trend and an empty buckets trend associated with the datasets.

17 Claims, 12 Drawing Sheets

METHOD AND SYSTEM FOR IMPLEMENTING HISTOGRAM-BASED ALARMS IN A PRODUCTION SYSTEM

BACKGROUND

Histogram-based analyses can be used, among other applications, for data classification. The distribution of data represented through histograms, however, are sensitive to certain constraints—one of which pertains to the number of intervals or buckets specified to generate the histograms.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for implementing histogram-based alarms through number of buckets optimization. Specifically, one or more embodiments of the invention entail generating histograms overlaid with frequency (i.e., number of data samples) based class policies to serve as data classifiers for measurements, metrics, or information produced by physical and/or logical sensors. The accurateness of histograms to represent distributions of data, however, may depend on certain constraints—one of which may be the number of intervals or buckets employed. Therefore, one or more embodiments of the invention also focuses on a methodology to identify an optimal number of buckets, for particular sensor specific datasets, based on a maximum samples trend and an empty buckets trend associated with the datasets.

Figure 1:
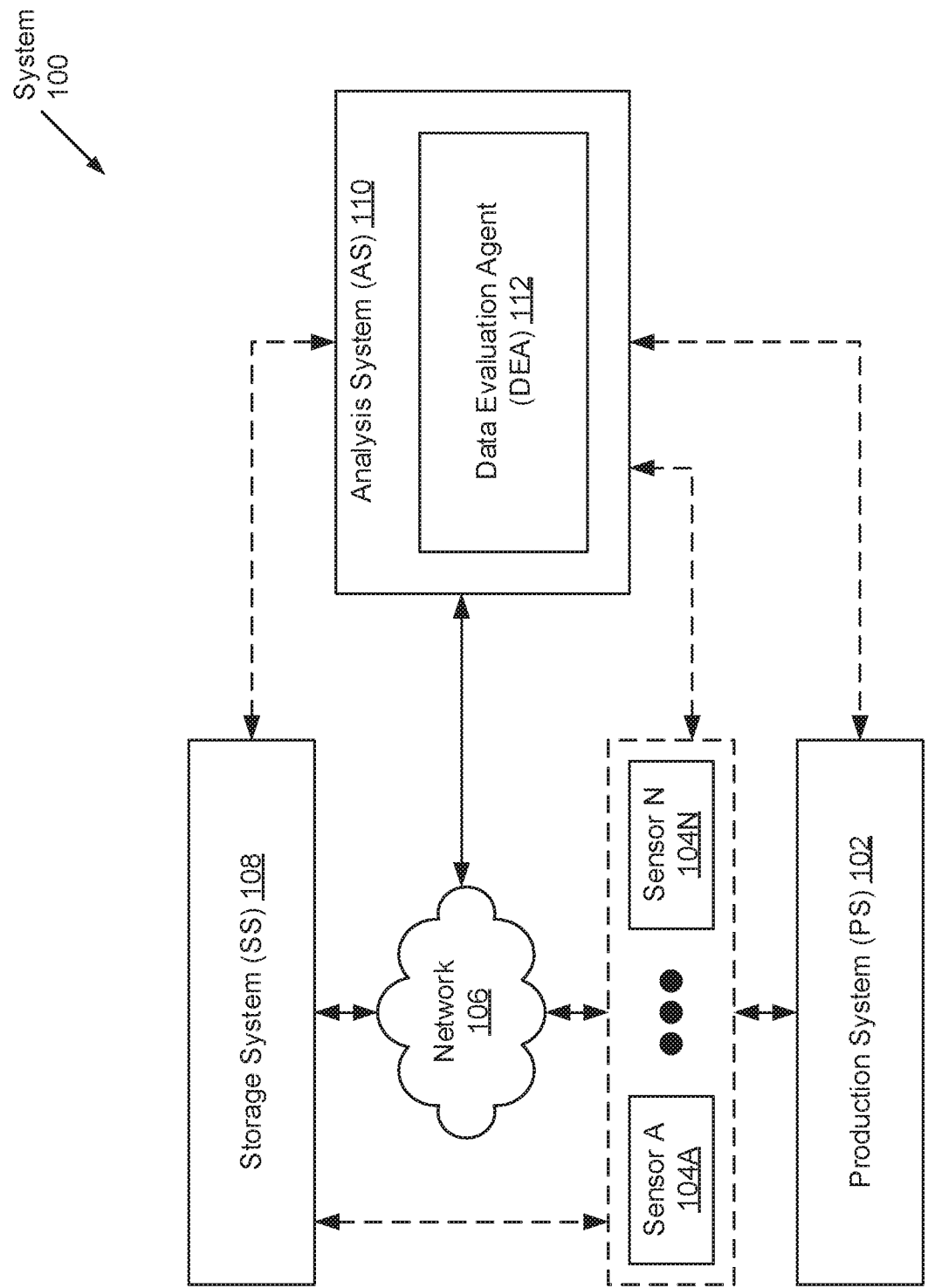
FIG. 1 shows a system in accordance with one or more embodiments of the invention.

FIG. 1 shows a system in accordance with one or more embodiments of the invention. The system (100) includes a production system (PS) (102), one or more sensors (104A-104N), a storage system (SS) (108), and an analysis system (AS) (110). Each of these components is described below.

In one embodiment of the invention, the aforementioned components may be directly or indirectly connected to one another through a network (106) (e.g., a local area network (LAN), a wide area network (WAN) such as the Internet, a mobile network, or any other network). The network (106) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the PS (102) may be any collection of regularly interacting, interrelated, and/or interdependent elements. Each constituent element (not shown) of the PS (102) may be a physical entity (i.e., representative of hardware), a logical entity (i.e., representative of software), or a combination thereof. In one embodiment of the invention, the PS (102) may be a device and/or a process, or alternatively, multiple devices and/or processes. Accordingly, each constituent element may implement one or more tangible components of, one or more functionalities of, one or more services rendered by, one or more computer processes executing on, one or more tasks/steps performed by, or any combination thereof of, the PS (102). In one embodiment of the invention, the PS (102) may be any physical and/or logical environment that includes one or more observable or measurable components and/or variables. Examples of a constituent element include, but are not limited to: an integrated circuit, an actuator, a computer process or program, a data object, an operation, etc. Moreover, examples of the PS (102) include, but are not limited to: a computing system (see e.g., FIG. 5), an industrial or manufacturing process, an apparatus, a database, a closed-loop system, an application program or suite, etc.

In one embodiment of the invention, one or more sensors (104A-104N) may operatively connect to, or execute on, the PS (102). Each sensor (104A-104N) may be a physical sensor, or alternatively, a logical sensor. A physical sensor may refer to a physical device capable of measuring one or more physical properties (e.g., heat, light, sound, pressure, magnetism, motion, etc.). A physical sensor may include further functionality to convert the measured physical stimuli into an electrical signal or data stream, which may be stored or transmitted to any other component (e.g., SS (108) or AS (110)) of the system (100). Examples of physical sensors include, but are not limited to: a microphone, a speedometer, a smoke detector, a gyroscope, a photodiode, etc. A logical sensor, on the other hand, may refer to any mechanism that relays digital information without dependence on hardware. Specifically, a logical sensor may entail software or firmware that may perform one or more operations towards providing queried or requested data. Examples of logical sensors include, but are not limited to: a database query performed periodically that returns the number of rows in a specific table, a computer readable program code script that counts the number of files in a specific directory, a service that tracks a user's current location by polling their Internet Protocol (IP) address at specified intervals, etc.

In one embodiment of the invention, the SS (108) may be a data repository or medium for consolidating various forms of data. The SS (108) may be implemented using any type of storage unit and/or device (e.g., a filesystem, a database, a collection of tables, or any other storage mechanism). Further, the SS (108) may be implemented using multiple storage units and/or devices, which may or may not be of the same type or located at the same physical site. In one embodiment of the invention, the SS (108) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the SS (108) may be configured to store one or more sampled datasets (SDs). Each SD (not shown) may be a time series, or a sequence of data samples provided by a sensor (104A-104N), where the sequence is indexed in time order. By way of an example, each data sample in a SD may be expressed as a tuple that includes at least two elements: (a) a timestamp; and (b) a data value. The timestamp may be a set of characters or encoded information identifying the instant in time the data value had been sampled by the sensor (104A-104N). The timestamp may, for example, capture the date and time of day (e.g., to fractions of a second). Further, the data value may be a numerical, or otherwise quantitative, representation of the respective property, variable, or information that the sensor (104A-104N) may be tasked with monitoring or retrieving. Moreover, in one embodiment of the invention, the time period or interval between data samples (i.e., the sampling frequency) exhibited in each SD may encompass any granularity of time, whereas the cardinality of (i.e., number of data samples in) each SD may be any positive-integer. Furthermore, in one embodiment of the invention, each SD, which may pertain to a different sensor (104A-104N), may be stored alongside (and thus correspond to) a sensor identifier (SID) unique to the sensor associated with the SD. One of ordinary skill in the art will appreciate that the SS (108) may be configured to store other information without departing from the scope of the invention.

In one embodiment of the invention, the AS (110) may be any platform directed to performing analyses. Specifically, the AS (110) may be a high performance system for facilitating large-scale and/or complex data processing. In one embodiment of the invention, the AS (110) may be implemented on one or more servers (not shown). Each server may be a physical server (i.e., in a datacenter) or a virtual server (i.e., that may be cloud-based). In another embodiment of the invention, the AS (110) may be implemented on one or more computing systems similar to the exemplary computing system shown in FIG. 5. Further, the AS (110) may be any set of computing systems that may be programmed to receive requests, process requests, and based on the processing of requests, provide intelligence and extend other services and/or resources to one or more other components (e.g., PS (102) or SS (108)) of the system (100).

In one embodiment of the invention, the AS (110) may host a data evaluation agent (DEA) (112). The DEA (112) may be a computer program, or a computer process (i.e., an instance of a computer program), that executes on the underlying hardware of the AS (110). Specifically, the DEA (112) may be a computer program or process tasked with implementing histogram-based alarms through number of buckets optimization in accordance with embodiments of the invention (see e.g., FIGS. 3-4D). The DEA (112) is described in further detail below with respect to FIG. 2.

While FIG. 1 shows a configuration of components, other system configurations may be used without departing from the scope of the invention. For example, the system (100) may include multiple (i.e., more than one) PSs (102) and SSs (108), which may be directly connected or operatively connected (through the network (106)) to one or more other components (i.e., the one or more sensors (104A-104N) or AS (110)) of the system (100).

Figure 2:
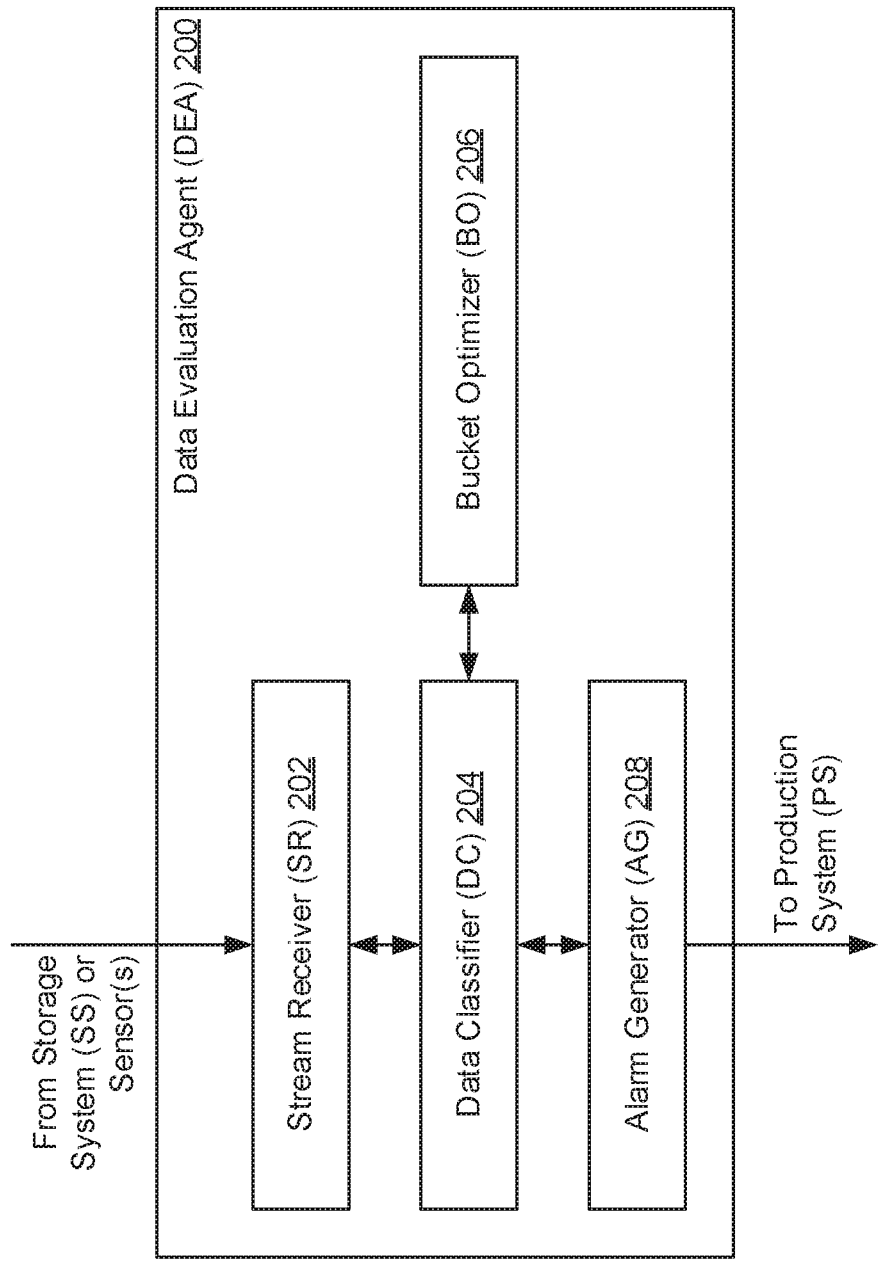
FIG. 2 shows a data evaluation agent in accordance with one or more embodiments of the invention.

FIG. 2 shows a data evaluation agent (DEA) in accordance with one or more embodiments of the invention. The DEA (200), as described above, may be a computer program or process tasked with implementing histogram-based alarms through number of buckets optimization. Towards achieving the aforementioned task, the DEA (200) includes a stream receiver (SR) (202), a data classifier (DC) (204), a bucket optimizer (BO) (206), and an alarm generator (AG) (208). Each of these components is described below.

In one embodiment of the invention, the SR (202) may be a computer process (i.e., an instance of a computer program, or the DEA (200)) that executes on the underlying hardware of an analysis system (AS) (see e.g., FIG. 1). Specifically, the SR (202) may be a computer process directed to interacting with one or more storage systems (SSs) and/or one or more sensors. Accordingly, the SR (202) may include functionality to: (i) receive data streams (i.e., packets of data) from one or more SSs and/or sensors; (ii) generate requests for sampled datasets (SDs) (described above); (iii) submit generated requests to SSs and/or sensors; (iv) upon receiving data streams, decode or extract SDs or new data samples (NDSs) from the data streams; and (v) provide the SDs or NDSs to the DC (204). The SR (202) may be tasked with performing other functionalities without departing from the scope of the invention.

In one embodiment of the invention, the DC (204) may be another computer process (i.e., another instance of a computer program, or the DEA (200)) that executes on the underlying hardware of an AS (see e.g., FIG. 1). Specifically, the DC (204) may be a computer process directed to classifying new data samples (NDSs) received from the SR (202). Accordingly, the DC (204) may include functionality to: (i) obtain NDSs and/or SDs from the SR (202); (ii) provide SDs to the BO (206); (iii) obtain, from the BO (206) and after the BO (206) processes the SDs, a response specifying an optimal number of buckets (ONB) (described below) for the provided SDs; (iv) generate distribution diagrams (DDs) using SDs and ONBs; (v) obtain class policies (CPs) pertaining to the SDs; (vi) generate sensor bucket classifiers (SBCs) by applying CPs onto DDs; (vii) ascertain the classification of NDSs based on the SBCs; and (viii) provide classification results to the AG (208). The DC (204) may be tasked with performing other functionalities without departing from the scope of the invention.

In one embodiment of the invention, the BO (206) may be another computer process (i.e., another instance of a computer program, or the DEA (200)) that executes on the underlying hardware of an AS (see e.g., FIG. 1). Specifically, the BO (206) may be a computer process directed to identifying the optimal number of buckets (ONB) for a particular SD. Accordingly, the BO (206) may include functionality to: (i) obtain SDs from the DC (204); (ii) process the obtained SDs towards determining the ONB in accordance with embodiments of the invention (see e.g., FIG. 3); and (iii) provide the determined ONB back to the DC (204). The BO (206) may be tasked with performing other functionalities without departing from the scope of the invention.

In one embodiment of the invention, the AG (208) may be another computer process (i.e., another instance of a computer program, or the DEA (200)) that executes on the underlying hardware of an AS (see e.g., FIG. 1). Specifically, the AG (208) may be a computer process directed to issuing alarms. Accordingly, the AG (208) may include functionality to: (i) obtain determined classifications for new data samples (NDSs) from the DC (204); (ii) generate notifications or messages, representative of alarms, based on the obtained classifications; and (iii) transmit the generated notifications/messages to, for example, one or more production systems (PSs). The AG (208) may be tasked with performing other functionalities without departing from the scope of the invention.

Figure 3:
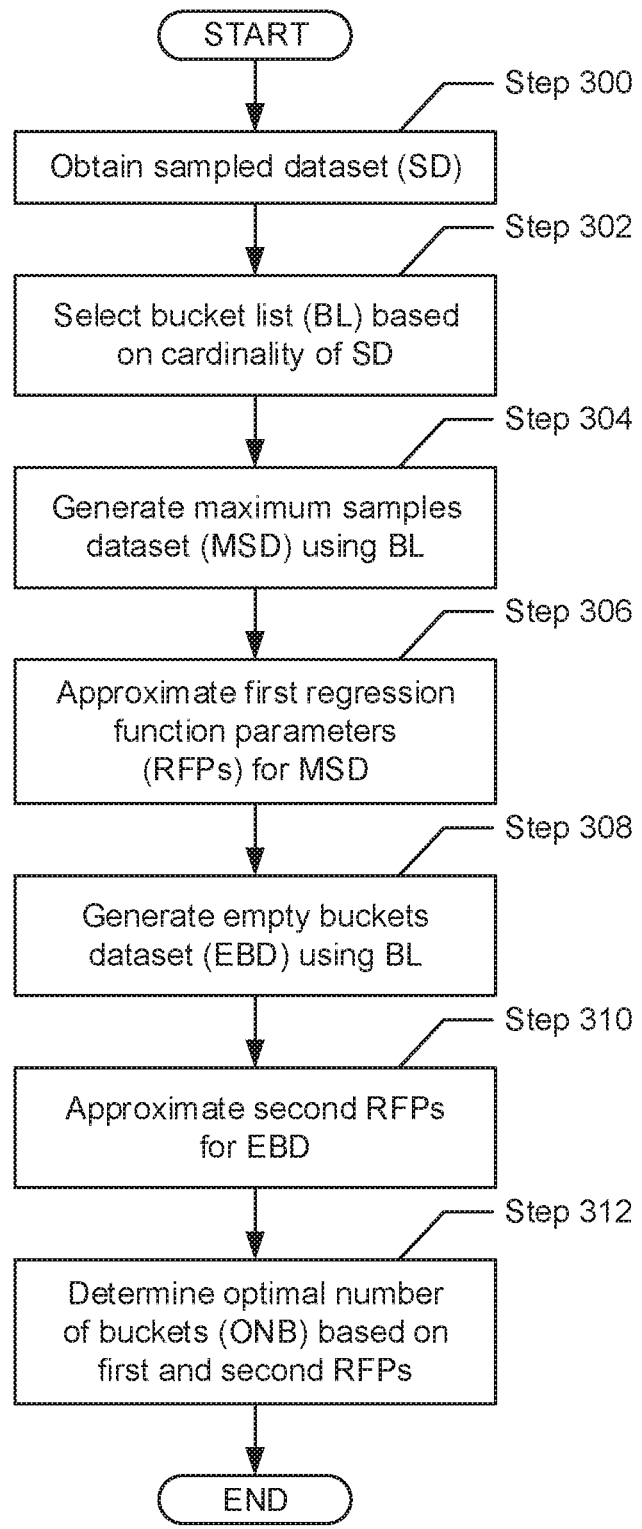
FIG. 3 shows a flowchart describing a method for determining an optimal number of buckets in accordance with one or more embodiments of the invention.

FIG. 3 shows a flowchart describing a method for determining an optimal number of buckets in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 3 may be performed in parallel with any other steps shown in FIGS. 4A-4D without departing from the scope of the invention.

Turning to FIG. 3, in Step 300, a sampled dataset (SD) is obtained. In one embodiment of the invention, the SD may be a time-series, or a sequence of data samples that is indexed in time order. Further, the SD may pertain to historical measurements, metrics, or information sampled or retrieved by a sensor (see e.g., FIG. 1) responsible for monitoring an aspect of a production system (PS). Accordingly, each data sample in the SD may be represented through a tuple that includes at least two elements: a timestamp and a data value—i.e., (timestamp, data value). The timestamp may pertain to a discrete time indicative of when the measurement, metric, or information had been sampled or retrieved, whereas the data value may specify the quantitative representation, at the aforementioned discrete time, of the PS aspect for which the sensor is responsible or had been monitoring.

In Step 302, a bucket list (BL) is selected. In one embodiment of the invention, the BL may be a data object or structure that specifies one or more positive-integer values. Each positive-integer value may be representative of a number of buckets parameter for defining a data distribution (e.g., histogram-based) analysis of the data samples in the SD (obtained in Step 300). Further, the one or more positive-integer values specified in the BL may be selected based on a cardinality (i.e., number of data samples) of the SD. Substantively, the BL may specify any positive-integer value within, and including, a value of one up to the cardinality of the SD. For example, for a SD with a cardinality of one-hundred (i.e., the SD includes one-hundred data samples), a BL selected for the SD may specify any one or more positive-integer values within, and including, one up to one-hundred (i.e., [1, 100]). Selection of the values specified in the BL may be determined by a randomization algorithm, a deterministic algorithm, or alternatively, by a predefined preference set by administrators of the PS and/or an analysis system (AS).

In Step 304, a maximum samples dataset (MSD) is generated using the BL (selected in Step 302). In one embodiment of the invention, the MSD may be a data-series that reflects the highest number of data samples, in any particular bucket in a data distribution diagram (e.g., histogram), as a function of the number of buckets parameter. Said another way, the MSD may be a data-series where the independent variable (i.e., representative of the horizontal axis) is the one or more number of buckets parameters specified in the BL, and where the dependent variable (i.e., representative of the vertical axis) is the maximum number of data samples in any bucket of a data distribution diagram defined by each number of buckets parameter specified in the BL.

In one embodiment of the invention, generation of each data element of the MSD, corresponding to a number of buckets parameter specified in the BL, may entail: (i) obtaining the number of buckets parameter; (ii) generating a data distribution diagram (e.g., histogram) of the SD (obtained in Step 300) by: (a) determining the range (i.e., set of all possible data values) of the SD; (b) binning or segregating the range into uniform (i.e., equal width) intervals or buckets quantified by the number of buckets parameter; and (c) disseminating the data samples in the SD across the intervals/buckets towards identifying how many data samples, defined by respective data values, fall into each interval/bucket; (iii) identifying the interval/bucket with the highest number of data samples therein; and (iv) storing, as a data element of the MSD, that highest number of data samples pertaining to the identified interval/bucket.

In Step 306, a first set of regression function parameters (RFPs) are approximated. In one embodiment of the invention, the first set of RFPs may specify one or more arguments of a regression function that best fits the MSD. The regression function may, for example, be a linear function or an exponential function. The argument(s) specified in the first set of RFPs for a linear regression function may include the slope and y-intercept, whereas the argument(s) specified in the first set of RFPs for an exponential regression function may include the exponential growth or decay factor and the initial value constant. One of ordinary skill will appreciate that the regression function that best fits the MSD may not be limited to the above-mentioned examples. Further, a selection of which best fit function to employ may be representative of a preference preset by administrators of the PS and/or an analysis system (AS) on which the method portrayed through FIG. 3 may be executing.

In Step 308, an empty buckets dataset (EBD) is generated using the BL (selected in Step 302). In one embodiment of the invention, the EBD may be a data-series that reflects the number of intervals/buckets, in a data distribution diagram (e.g., histogram), that are empty (i.e., contain zero data samples) as a function of the number of buckets parameter. Said another way, the EBD may be a data-series where the independent variable (i.e., representative of the horizontal axis) is the one or more number of buckets parameters specified in the BL, and where the dependent variable (i.e., representative of the vertical axis) is the number of empty intervals/buckets of a data distribution diagram defined by each number of buckets parameter specified in the BL.

In one embodiment of the invention, generation of each data element of the EBD, corresponding to a number of buckets parameter specified in the BL, may entail: (i) obtaining the number of buckets parameter; (ii) generating a data distribution diagram (e.g., histogram) of the SD (obtained in Step 300) by: (a) determining the range (i.e., set of all possible data values) of the SD; (b) binning or segregating the range into uniform (i.e., equal width) intervals or buckets quantified by the number of buckets parameter; and (c) disseminating the data samples in the SD across the intervals/buckets towards identifying how many data samples, defined by respective data values, fall into each interval/bucket; (iii) identifying zero or more intervals/buckets that include zero data samples therein; and (iv) storing, as a data element of the EBD, that number of identified intervals/buckets.

In Step 310, a second set of RFPs are approximated. In one embodiment of the invention, the second set of RFPs may specify one or more arguments of a regression function that best fits the EBD. The regression function may, for example, be a linear function or an exponential function. The argument(s) specified in the second set of RFPs for a linear regression function may include the slope and y-intercept, whereas the argument(s) specified in the second set of RFPs for an exponential regression function may include the exponential growth or decay factor and the initial value constant. One of ordinary skill will appreciate that the regression function that best fits the EBD may not be limited to the above-mentioned examples. Further, a selection of which best fit function to employ may be representative of a preference preset by administrators of the PS and/or AS.

In one embodiment of the invention, the selected regression function type used to best fit the MSD (in Step 306) may match the selected regression function type used to best fit the EBD (in Step 310). For example, should a linear regression function be selected to approximate the MSD, then a linear regression function may be selected to approximate the EBD as well. Alternatively, in another embodiment of the invention, the selected regression function types used to best fit the MSD and the EBD may be different.

In Step 312, an optimal number of buckets (ONB) is determined. In one embodiment of the invention, the ONB may be an ideal number of intervals (or buckets) into which the range (i.e., the set of all possible data values) of the SD (obtained in Step 300) is segregated during data distribution analyses. That is, when considering, for example, the generation of a histogram using the data samples in the SD, an ideal number of intervals/buckets (i.e., the ONB) is such that the resulting distribution of data would render a certain number of empty buckets while the highest number of samples in any particular bucket is above a minimum constant (e.g., one).

In one embodiment of the invention, the ONB may relate to the point of intersection between the regression function that approximates the MSD and the regression function that approximates the EBD. Consequently, determination of the ONB may be based on the first set of RFPs (obtained in Step 306), which pertain to the regression function for the MSD, and the second set of RFPs (obtained in Step 310), which pertain to the regression function for the EBD. More specifically, the ONB may be representative of the independent variable (i.e., number of buckets) value at the aforementioned point of intersection, which may be determined by solving a system of equations that includes the MSD and EBD regression functions.

By way of a non-limiting example, assume that the regression function representative of the MSD is an exponential growth/decay function, which may be generally expressed as follows: $R_{MSD}(x)=B1 \cdot e^{A1 \cdot x}$, where B1 is a first RFP (i.e., initial value constant) of the first set of RFPs, where A1 is a second RFP (i.e., exponential growth/decay factor) of the first set of RFPs, and where x is the independent variable (i.e., number of buckets). Further, assume that the regression function representative of the EBD is also an exponential growth/decay function, which may be generally expressed as follows: $R_{EBD}(x)=B2 \cdot e^{A2 \cdot x}$, where B2 is a first RFP (i.e., initial value constant) of the second set of RFPs, where A2 is a second RFP (i.e., exponential growth/decay factor) of the second set of RFPs, and where x again is the independent variable (i.e., number of buckets). Then, based on these two assumptions, the independent variable value, denoting the ONB, at the point of intersection between the two above-recited regression functions may be resolved through the following expression: $x=\ln(B2/B1)/(A1-A2)$.

By way of another non-limiting example, assume that the regression function representative of the MSD is a linear function, which may be generally expressed as follows: $R_{MSD}(x)=A1 \cdot x+B1$, where A1 is a first RFP (i.e., slope) of the first set of RFPs, where B1 is a second RFP (i.e., y-intercept) of the first set of RFPs, and where x is the independent variable (i.e., number of buckets). Further, assume that the regression function representative of the EBD is also a linear function, which may be generally expressed as follows: $REBD(x)=A2 \cdot x+B2$, where A2 is a first RFP (i.e., slope) of the second set of RFPs, where B2 is a second RFP (i.e., y-intercept) of the second set of RFPs, and where x again is the independent variable (i.e., number of buckets). Then, based on these two assumptions, the independent variable value, denoting the ONB, at the point of intersection between the two above-recited regression functions may be resolved through the following expression: $x=(B2-B1)/(A1-A2)$.

FIGS. 4A-4D show flowcharts describing a method for issuing alarms in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 4A-4D may be performed in parallel with any other steps shown in FIG. 3 without departing from the scope of the invention.

Figure 4A:
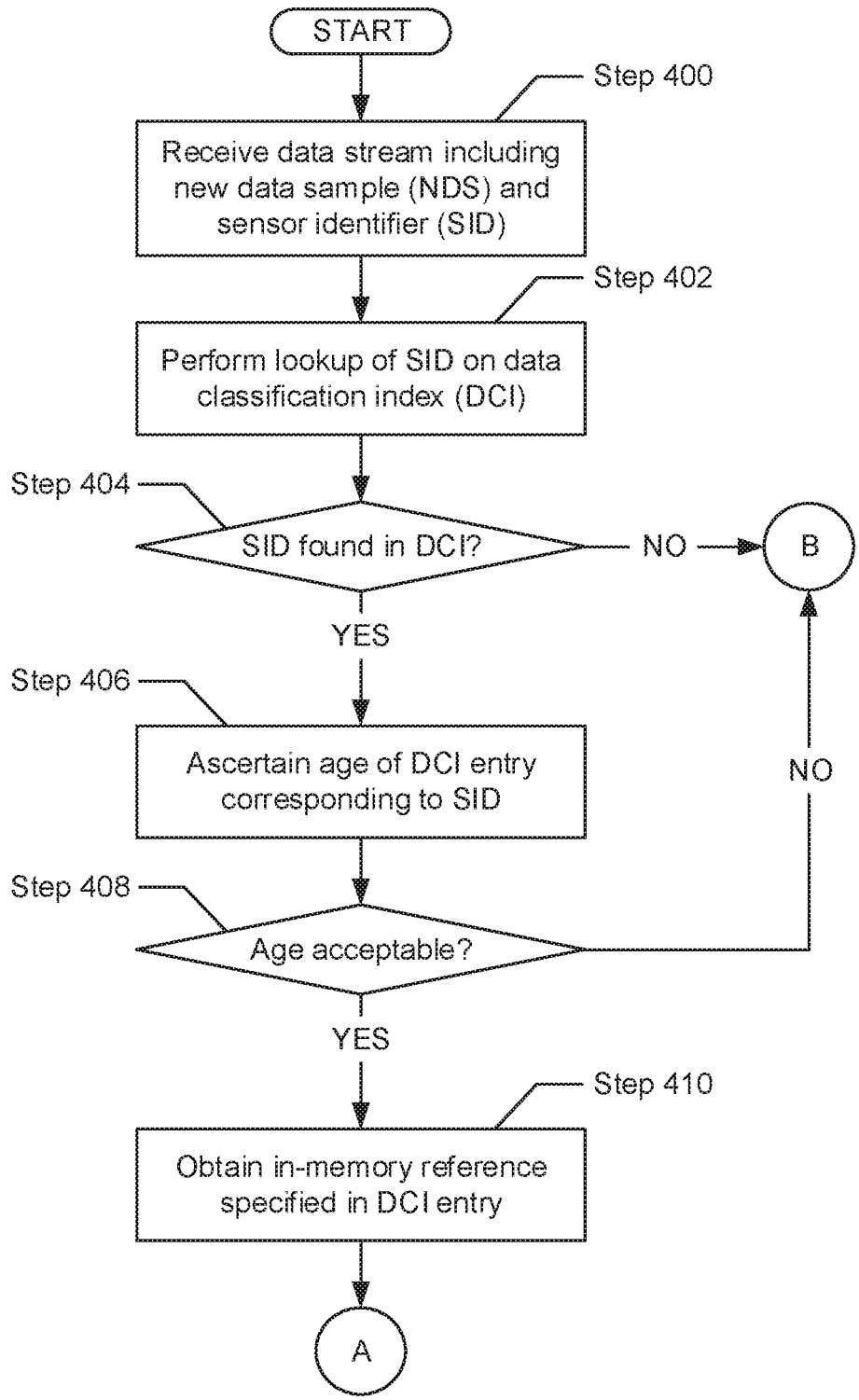
FIGS. 4A-4D show flowcharts describing a method for issuing alarms in accordance with one or more embodiments of the invention.

Turning to FIG. 4A, in Step 400, a data stream is received. In one embodiment of the invention, the data stream may pertain to one or more packets of data that originated from an operatively connected storage system (SS), or alternatively, an operatively connected sensor (see e.g., FIG. 1). The data stream may include a new data sample (NDS) and a sensor identifier (SID). The NDS may embody a new measurement, metric, or information that has been sampled or retrieved by a sensor responsible for an aspect of a production system (PS). Further, the NDS may be represented through a tuple that includes at least two elements: a timestamp and a data value—i.e., (timestamp, data value). The timestamp may pertain to a discrete time indicative of when the measurement, metric, or information had been sampled or retrieved, whereas the data value may specify the quantitative representation, at the aforementioned discrete time, of the PS aspect for which the sensor is responsible or had been monitoring. Moreover, the SID may be a string of characters (e.g., letters, numbers, symbols, etc.) for uniquely identifying the aforementioned sensor. By way of an example, the SID may be an alphanumeric tag, or may be a N-bit integer (where N>0) expressed in hexadecimal notation.

In Step 402, a lookup is performed using the SID (obtained in Step 400). Specifically, in one embodiment of the invention, a search may be conducted for an entry in a data classification index (DCI) that specifies the SID. The DCI may be an in-memory data structure (e.g., residing in the memory of an analytic system (AS)) that maps SIDs to sensor-specific data classifiers (i.e., sensor bucket classifiers (SBCs)) (described below). Each sensor-specific data classifier may encompass a data distribution (e.g., histogram) based classification paradigm directed to assigning data samples, provided by a particular sensor, to classes based on one or more class policies (CPs) (described below). Thereafter, these classifications may be subsequently used to issue, if any, one or more alarms appropriate to the classifications. In one embodiment of the invention, the DCI may be an in-memory data structure that includes one or more entries. Each entry may store at least the following information: (a) a SID; (b) an in-memory reference (or address) pointing to a memory location in AS memory; and (c) a timestamp representative of the creation date of the entry, and thus, an indicator for an age of the sensor-specific data classifier.

In Step 404, a determination is made as to whether the SID (obtained in Step 400) is found in the DCI. If it is determined that an entry in the DCI specifies the SID, then the process proceeds to Step 406. On the other hand, if it is alternatively determined that none of the entries in the DCI specify the SID, then the process proceeds to Step 440 (see e.g., FIG. 4C).

In Step 406, after determining (in Step 404) that an entry in the DCI specifies the SID (obtained in Step 400), the age of the DCI entry is ascertained. In one embodiment of the invention, ascertaining the age of the DCI entry may entail: (i) accessing the DCI entry; (ii) retrieving a timestamp (described above) specified in the DCI entry; and (iii) determining an age of the DCI entry based on a difference between the retrieved timestamp and a current date/time. By way of examples, the age of the DCI entry may be of the order of seconds up to weeks or months.

In Step 408, another determination is made as to whether the age of the DCI entry (ascertained in Step 406) is acceptable. In one embodiment of the invention, an acceptability of the age may depend on, for example, a predetermined threshold age. The predetermined threshold age would, in such an embodiment, deter the use of stale sensor data (e.g., measurements, metrics, and/or information) to generate and/or tune the sensor-specific data classifier (i.e., SBC). That is, in one embodiment of the invention, stale sensor data may negatively impact the accurateness of the sensor-specific data classifier. Further, the predetermined threshold age may be represented through any granularity of time (e.g., seconds to days to months), and may be preset, or alternatively, dynamically updated, by administrators of an AS and/or PS. Moreover, the predetermined threshold age may be a parameter value stored in, as well as retrieved from, AS memory. Continuing with Step 408, if it is determined that the age of the DCI entry is below the predetermined threshold age, then the age of the DCI entry is acceptable, and the process proceeds to Step 410. On the other hand, if it is alternatively determined that the age of the DCI entry is above the predetermined threshold age, then the age of the DCI entry is unacceptable, and the process proceeds to Step 440 (see e.g., FIG. 4C).

In Step 410, an in-memory reference, specified in the DCI entry (identified in Step 404), is obtained. In one embodiment of the invention, as described above, the in-memory reference may be a pointer or address that references a location in AS memory wherein information characteristic of the SBC for the sensor associated with the SID (obtained in Step 400) resides.

Figure 4B:
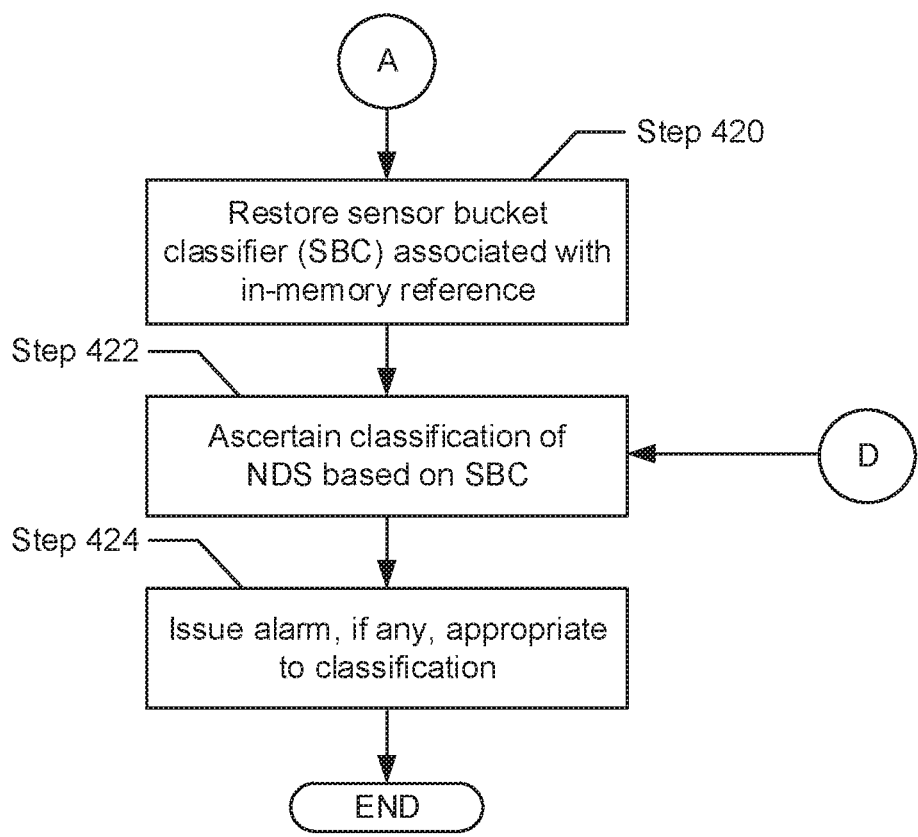

Turning to FIG. 4B, in Step 420, after obtaining the in-memory reference (in Step 410), information characteristic of the SBC is retrieved from a memory location referenced by the in-memory reference. Thereafter, in one embodiment of the invention, the aforementioned SBC information may be used to restore the SBC. The SBC information may encompass the minimal information necessary not only to define the SBC, but also to compactly store the SBC in memory. In one embodiment of the invention, the SBC information may be represented, for example, by a multi-entry data structure, where each entry in the data structure may define an interval/bucket of the distribution diagram (e.g., histogram) fundamentally representative of the SBC. Specifically, each entry in the data structure may include the following interval/bucket definition information: (a) a positive-integer value enumerating the interval/bucket; (b) a lower range boundary quantifying the minimum data value that a data sample would need in order to associate with the interval/bucket; (c) an upper range boundary quantifying the maximum data value that the data sample would further need to in order to associate with the interval/bucket; and (d) a class label (e.g., "normal", "warning", "critical", etc.) relating the interval/bucket, and therefore, any data samples falling therein, to a particular classification.

In Step 422, after restoring the SBC (in Step 420) or storing a new DCI entry in the DCI (in Step 466; see e.g., FIG. 4D), a classification for the NDS (obtained in Step 400) is ascertained. More specifically, in one embodiment of the invention, a classification for the NDS is ascertained based on the information characteristic of the SBC. Identification of the classification for the NDS may entail: (i) obtaining the data value associated with the NDS; (ii) identifying the interval/bucket defined by a lower range boundary that is less than the data value and an upper range boundary that is greater than the data value; and (iii) associating the NDS with the class label (and, therefore, the classification) associated with the identified interval/bucket. By way of examples, the NDS may be assigned under: (a) a "normal" classification, which may be indicative that the PS aspect, represented through the data value associated with the NDS, is within a normal operating range of values; (b) a "warning" classification, which may be indicative that the PS aspect, represented through the data value associated with the NDS, is outside a normal operating range of values, however, still within an acceptable outlier tolerance; and (c) a "critical" classification, which may be indicative that the PS aspect, represented through the data value associated with the NDS, is outside the normal operating range of values and, further, beyond the acceptable outlier tolerance. Additional or alternative classifications may be used without departing from the scope of the invention.

In Step 424, an alarm appropriate to the classification (ascertained in Step 422) is issued. In one embodiment of the invention, issuance of the alarm may entail generating a notification or a message and, subsequently, transmitting the notification/message towards the PS. In one embodiment of the invention, an alarm may be issued for any classification—e.g., for "normal", "warning", and "critical" classifications. In another embodiment of the invention, an alarm may be issued for one or more classifications that would require action or intervention impacting the operation of the PS—e.g., for "warning" and/or "critical" classifications. Furthermore, in one embodiment of the invention, information disclosed in the notification/message and, thus, the alarm, may include, but is not limited to: (a) the sensor identifier (SID) (associated with the NDS and obtained in Step 400); (b) the data value associated with the NDS; and (c) the class label with which the NDS is associated (in Step 422). Upon receiving the issued alarm, the PS may, for example: (i) identify the sensor associated with the SID; (ii) determine the aspect of the PS for which the identified sensor is responsible; and (iii) adjust one or more factors controlling that aspect of the PS such that the PS aspect returns within normal operating parameters.

Figure 4C:
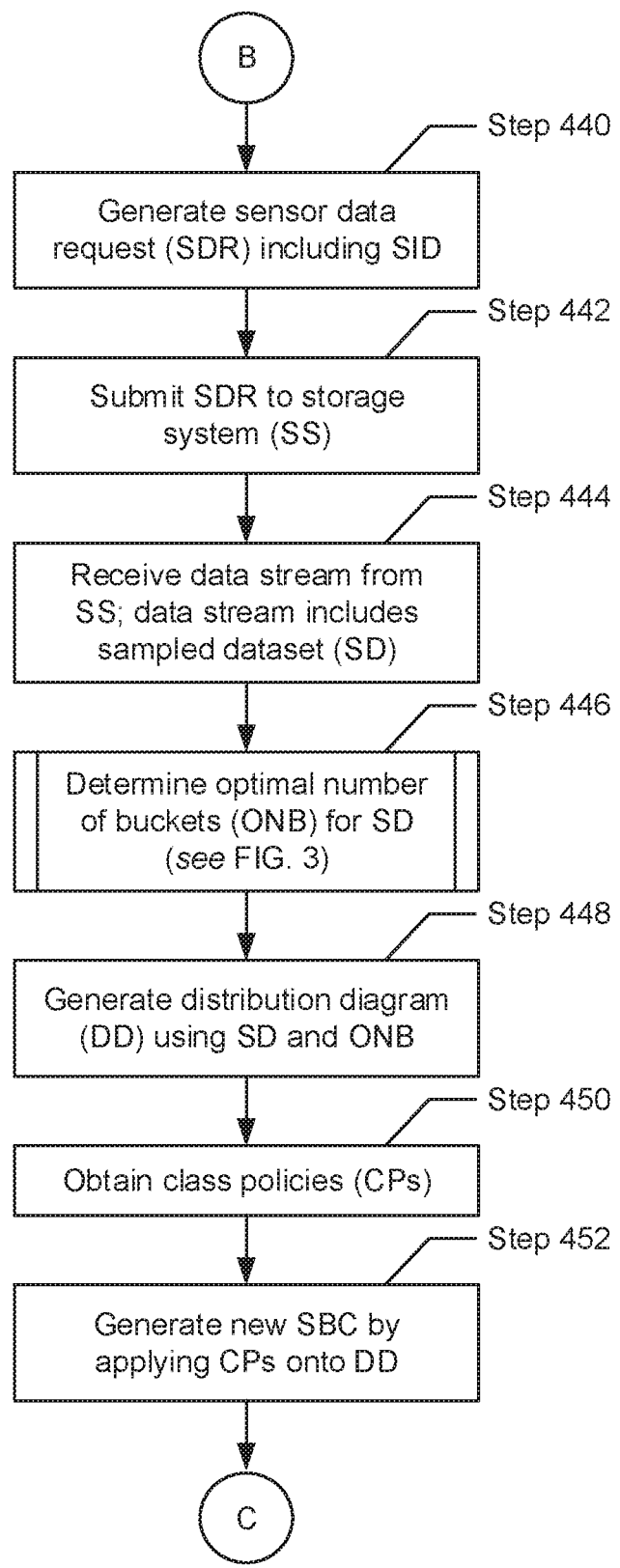

Turning to FIG. 4C, in Step 440, after determining (in Step 404) that the SID (obtained in Step 400) is not specified in any data classification index (DCI) entries or, alternatively, after determining (in Step 408) that the age of the DCI entry (ascertained in Step 406) is unacceptable, a sensor data request (SDR) is generated. In one embodiment of the invention, the SDR may include the SID. Further, the SDR may pertain to acquiring a select set of more recent data samples provided by the sensor associated with the SID. Accordingly, in another embodiment of the invention, the SDR may further include either: (a) a cut-off timestamp, where the aforementioned select set of more recent data samples would include newer data samples associated with timestamps up to and/or including the specified cut-off timestamp; or (b) a sample size value, where a cardinality of (i.e., the number of data samples in) the aforementioned select set of more recent data samples would equal the specified sample size value.

In Step 442, the SDR (generated in Step 440) is submitted. That is, in one embodiment of the invention, the SDR may be transmitted towards a storage system (SS) (see e.g., FIG. 1) for processing. In Step 444, a data stream is received, from the SS, in response to the submission of the SDR (in Step 442). The data stream may include a sampled dataset (SD). In one embodiment of the invention, the SD may be a time-series, or a sequence of data samples that is indexed in time order. Further, the SD may pertain to measurements, metrics, or information sampled or retrieved by the sensor, responsible for monitoring an aspect of a production system (PS), associated with the SID (obtained Step 400). Accordingly, each data sample in the SD may be represented through a tuple that includes at least two elements: a timestamp and a data value—i.e., (timestamp, data value). The timestamp may pertain to a discrete time indicative of when the measurement, metric, or information had been sampled or retrieved, whereas the data value may specify the quantitative representation, at the aforementioned discrete time, of the PS aspect for which the sensor is responsible or had been monitoring.

In Step 446, an optimal number of buckets (ONB) is determined. Specifically, in one embodiment of the invention, an ONB may be determined for the SD (obtained in Step 444). The ONB may refer to an ideal number of intervals/buckets that defines, for example, a histogram, such that the resulting distribution of data would render a certain number of empty buckets while the highest number of samples in any particular bucket is above a minimum constant (e.g., one). Details describing the determination of the ONB is described above with respect to FIG. 3.

In Step 448, a distribution diagram (DD) is generated using the SD (obtained in Step 444). In one embodiment of the invention, the DD may be, for example, a histogram, and therefore, may be representative of the distribution of the data values in the SD. Further, towards generating the DD, the number of intervals/buckets into which the range of the data values is segregated may be quantified by the ONB (determined in Step 446). Generation of the DD may entail: (i) obtaining the ONB; and (ii) generating the DD using the SD by: (a) determining the range (i.e., set of all possible data values) of the SD; (b) binning or segregating the range into uniform (i.e., equal width) intervals or buckets quantified by the ONB; and (c) disseminating the data samples in the SD across the intervals/buckets towards identifying how many data samples, defined by respective data values, fall into each interval/bucket.

In Step 450, one or more class policies (CPs) are obtained. In one embodiment of the invention, a CP may refer to a rule, condition, or guideline for designating (or assigning) intervals/buckets portrayed in the DD (generated in Step 448) into classifications. Further, each classification may group one or more intervals/buckets based on the frequency of (or number of data samples contained in) those one or more intervals/buckets. Subsequently, in one embodiment of the invention, a CP may specify, but is not limited to specifying, the following information: (a) a class label (e.g., "normal", "warning", "critical") referencing a classification in which an interval/bucket may belong; (b) a lower frequency boundary (e.g., ten data samples) referencing a minimum frequency limit that defines the classification; and/or (c) an upper frequency boundary (e.g., fifty data samples) referencing a maximum frequency limit that defines the classification. Moreover, in one embodiment of the invention, CPs may be retrieved from on-board memory residing on an analysis system (AS) (see e.g., FIG. 1). The CPs may be loaded and/or updated thereon by administrators of the AS and/or a production system (PS).

In another embodiment of the invention, one or more CPs may alternatively define one or more classifications based on a percentage of the data samples when intervals/buckets of the DD are sorted in descending order. That is, when considering the intervals/buckets sorted in descending order based on their respective frequencies: (a) a first CP may specify that a first subset of intervals/buckets are to be directed to a first classification, where the first subset of intervals/buckets collectively contain a first percentage of the total number of data samples portrayed in the DD; (b) a second CP may then specify that a second subset of intervals/buckets are to be directed to a second classification, where the second subset of intervals/buckets and the first subset of intervals/buckets collectively contain a second percentage of the total number of data samples (i.e., where the second percentage is obviously larger than the first percentage); and (c) a third CP may subsequently specify that any remaining intervals/buckets, which are not represented in either the first or second subsets of intervals/buckets, are to be directed to a third classification.

By way of an example, following Step 448 above, assume that a DD is generated using an ONB of 10 buckets, where each of the 10 buckets is associated with a respective frequency (i.e., contains a respective subset of the total number of data samples portrayed in the DD). Thereafter, based on their respective frequencies, the 10 buckets are sorted in descending order (i.e., where the bucket with the highest frequency (or containing the highest number of data samples) is ranked first or at the top, and where the bucket with the lowest frequency (or containing the lowest number of data samples) is ranked last or at the bottom)—as portrayed the table below.

| Bucket Rank | Bucket ID | Value Range | Frequency |
|---|---|---|---|
| 1 | B7 | [0.6, 0.7] | 25 |
| 2 | B1 | [0.0, 0.1] | 19 |
| 3 | B10 | [0.9, 1.0] | 15 |
| 4 | B3 | [0.2, 0.3] | 12 |
| 5 | B8 | [0.7, 0.8] | 11 |
| 6 | B2 | [0.1, 0.2] | 8 |
| 7 | B5 | [0.4, 0.5] | 6 |
| 8 | B9 | [0.8, 0.9] | 3 |
| 9 | B4 | [0.3, 0.4] | 1 |
| 10 | B6 | [0.5, 0.6] | 0 |
| Total Frequency (Number of Data Samples): | | | 100 |

Further, based on the above sorting of the 10 buckets in descending order, a first topmost (or most populous) subset of the 10 buckets that collectively contain at least a first percentage (e.g., 80%) of the total number of data samples are directed to a first classification (e.g., the "normal" classification). Based on the above table, Buckets B7, B1, B10, B3, and B8, which collectively contain 82 data samples (or 82% of the total number of data samples), are assigned to the "normal" classification. Next, a second topmost (or most populous) subset of the 10 buckets, which along with the first topmost subset, collectively contain at least a second percentage (e.g., 95%) of the total number of data samples are directed to a second classification (e.g., the "warning" classification). That is, based on the above table, it can be determined that the first topmost subset (i.e., Buckets B7, B1, B10, B3, and B8) plus Buckets B2 and B5 (i.e., representative of the second topmost subset) collectively contain 96 data samples (or 96% of the total number of data samples). Therefore, Buckets B2 and B5 are assigned to the "warning" classification. Lastly, the remaining buckets—i.e., Buckets B9, B4, and B6—which are neither associated with the first topmost subset nor the second topmost subset, are assigned to a third classification (e.g., the "critical" classification).

In Step 452, a new SBC is generated. Specifically, in one embodiment of the invention, the new SBC may be generated through the application of the one or more CPs (obtained in Step 450) onto the DD (generated in Step 448). More specifically, through applying each CP onto the DD, one or more intervals/buckets presented in the DD may be assigned to the classification associated with the CP. As described above, assignment of an interval/bucket into a particular classification may be based on the frequency (or number of data samples contained in) the interval/bucket, as well as based on a lower frequency boundary and/or upper frequency boundary defining the particular classification.

Figure 4D:
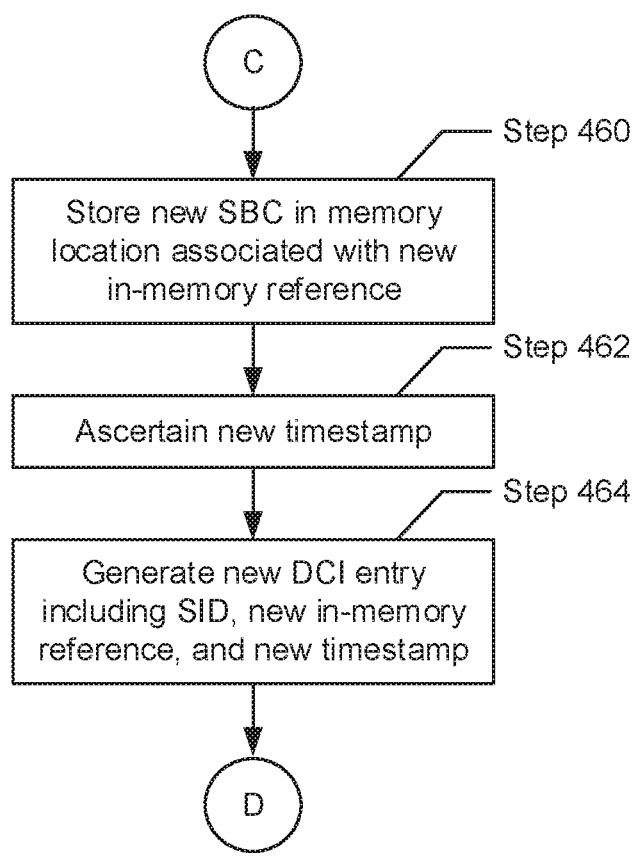

Turning to FIG. 4D, in Step 460, after generating the new SBC (in Step 452), the new SBC is subsequently stored. More specifically, in one embodiment of the invention, information characteristic of the new SBC may be stored. Further, this aforementioned new SBC information may be stored in a memory location residing in AS memory, where the memory location may be identified through a unique memory address or pointer (i.e., a new in-memory reference). The new SBC information may encompass the minimal information necessary not only to define the new SBC, but also to compactly store the new SBC in memory. In one embodiment of the invention, the new SBC information may be represented, for example, by a multi-entry data structure, where each entry in the data structure may define an interval/bucket of the DD (e.g., histogram) (generated in Step 448) that is fundamentally representative of the new SBC. Specifically, each entry in the data structure may include the following interval/bucket definition information: (a) a positive-integer value enumerating the interval/bucket; (b) a lower range boundary quantifying the minimum data value that a data sample would need in order to associate with the interval/bucket; (c) an upper range boundary quantifying the maximum data value that the data sample would further need to in order to associate with the interval/bucket; and (d) a class label (e.g., "normal", "warning", "critical", etc.) relating the interval/bucket, and therefore, any data samples falling therein, to a particular classification.

In Step 462, a new timestamp is ascertained. In one embodiment of the invention, the new timestamp may be a set of characters or encoded information representative of the instant in time, in any granularity, that marks the creation and/or storage of the new SBC. Furthermore, in Step 464, a new DCI entry is generated. In one embodiment of the invention, the new DCI entry may include the SID (obtained in Step 400), the new in-memory reference (obtained in Step 460), and the new timestamp (ascertained in Step 462). Moreover, any existing DCI entry that may specify the SID, if any, may be removed (or deleted). Alternatively, in another embodiment of the invention, rather than generating a new DCI entry, an existing DCI entry that already specifies the SID may be updated. Updating of an existing DCI entry may entail replacing an existing in-memory reference with the new in-memory reference and replacing an existing timestamp with the new timestamp. After generating a new DCI entry or, alternatively, updating an existing DCI entry, the process proceeds to Step 422 (see e.g., FIG. 4B).

Figure 5:
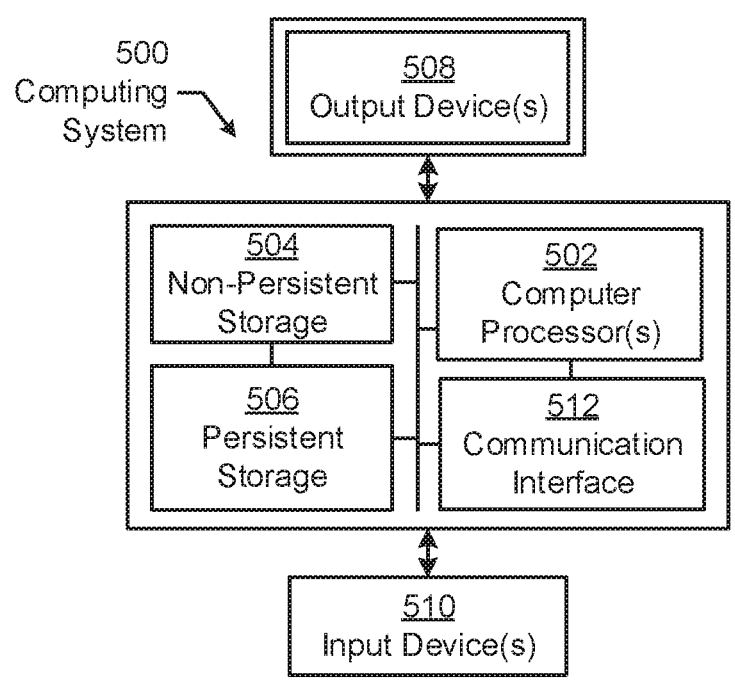
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512)

may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 6A-6D show various aspects pertaining to an example in accordance with one or more embodiments of the invention. The following example, presented in conjunction with components shown in FIGS. 6A-6D, is for explanatory purposes only and not intended to limit the scope of the invention.

Turning to the example, consider a system substantially similar to the exemplary system shown in FIG. 1. Further, assume: (i) that the production system (PS) is a power generating plant that includes a boiler; (ii) that the sensor is a thermocouple at least partially disposed within the boiler and programmed to monitor the temperature therein periodically; (iii) that the storage system (SS) is a network-attached storage (NAS) device located at a first remote site; and (iv) that the analytic system (AS) is a mainframe located at a second remote site. Moreover, as portrayed in FIG. 1, the mainframe may host a data evaluation agent (DEA) (i.e., a computer program or process) that is executing thereon.

Moreover, assume the sensor (i.e., thermocouple) produces a new data sample (NDS) (i.e., a new temperature measurement), which finds its way to the AS and, subsequently, to the DEA. Alongside the NDS, the DEA also receives a sensor identifier (SID) unique to the sensor. Using the SID, the DEA proceeds to perform a lookup on a data classification index (DCI)—an in-memory data structure that catalogs sensor-specific data classifiers (i.e., sensor bucket classifiers (SBCs)), if any. The lookup may entail searching through the various entries of the DCI for another SID specified therein that matches the received SID. Assume, however, that based on the lookup, the DEA fails to find an entry in the DCI that specifies the received SID.

Because of the above determination, the DEA then proceeds to generate a sensor data request (SDR), which includes the received SID. After generating the SDR, the DEA subsequently submits or, rather, transmits, the SDR to the SS (i.e., NAS device). At this point, the SS has been receiving and consolidating data samples from the sensor, as well as other sensors associated with the PS (i.e., the power generating plant) since their respective activations. Upon obtaining the SDR, the SS aggregates a sampled dataset (SD) pertaining to the SID, and forwards the SD back towards the AS via a data stream.

From here, the DEA obtains the SD, which includes a number of the most recent data samples (excluding the NDS) produced by the sensor. Each data sample in the SD, as well as the NDS, is a two element tuple—e.g., (timestamp, data value). Thereafter, using the SD, the DEA determines an optimal number of buckets (ONB) value in accordance with the method portrayed in FIG. 3. Specifically, as an initial step, the DEA first selects a bucket list (BL) based on a cardinality of (i.e., number of data samples in) the SD. The BL may be a data array that includes a number of elements, where each element specifies a positive-integer value from one up to the value representative of the aforementioned cardinality of the SD. For the purposes of this example, assume: (i) that the cardinality of the SD is 75 (i.e., the SD includes 75 data samples); and (ii) that the selected BL specifies 53 positive integer values from 1 to 53 (i.e., BL={1, 2, 3, . . . , 50, 51, 52, 53}). Further, each value specified in the BL is representative of a number of buckets value.

Figure 6A:
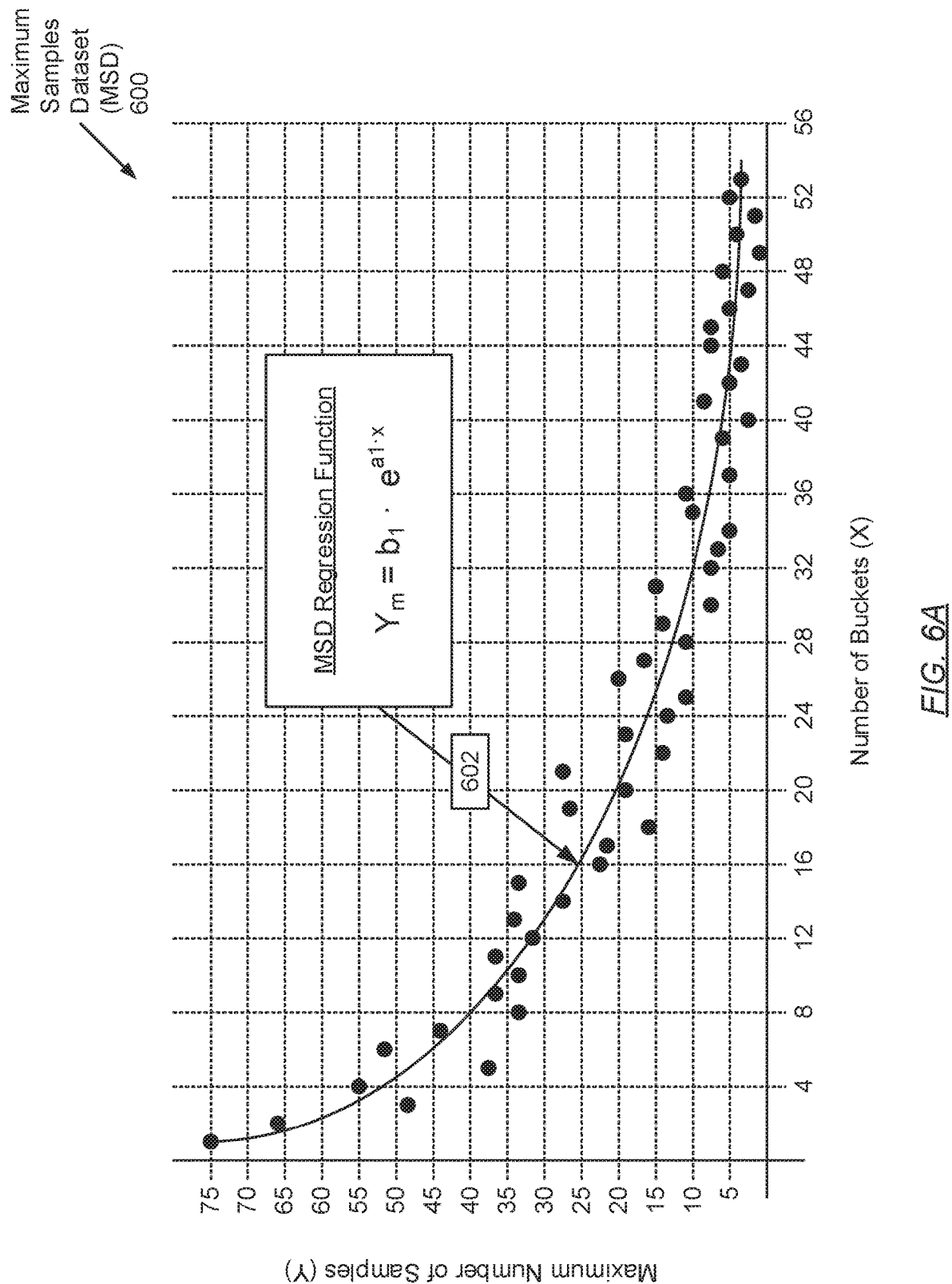
FIG. 6A shows an example maximum samples dataset in accordance with one or more embodiments of the invention.

After selecting the BL, the DEA generates a maximum samples dataset (MSD) based on the BL and the distribution of the data values specified in the SD. Each element in the MSD corresponds to a number of buckets value specified in the BL and, further, may be representative of the highest number of data samples contained in any particular bucket conveyed in a histogram of the SD, where the histogram is defined by the number of buckets value corresponding to the element in the MSD. By way of an example, for a number of buckets value of four, a histogram of the data values in the SD may be generated, where the range of the data values specified in the SD is divided into four buckets, and where each of the data values fall into one of the four buckets. Further, assume that based on the distribution of the data values across the four buckets, the highest number of data samples contained in any of the four buckets is 55 data samples. Accordingly, the element in the MSD, which corresponds to the number of buckets value of four, would be set to 55 (i.e., BL[n]=4; MSD[n]=55). FIG. 6A shows a graphical representation of an example MSD (600) for all 53 number of bucket values specified in the BL.

Following the generation of the MSD, the DEA determines a best fit function—i.e., a MSD regression function—that is representative of the MSD. For the example MSD (600) depicted in FIG. 6A, the MSD regression function (602) may be an exponential decay function, which may be generally expressed as follows: $Y_M = b_1 \cdot e^{a_1 \cdot x}$, where Y is representative of the maximum number of samples, X is representative of the number of buckets, $b_1$ is an initial value constant, and $a_1$ is the exponential decay factor.

Figure 6B:
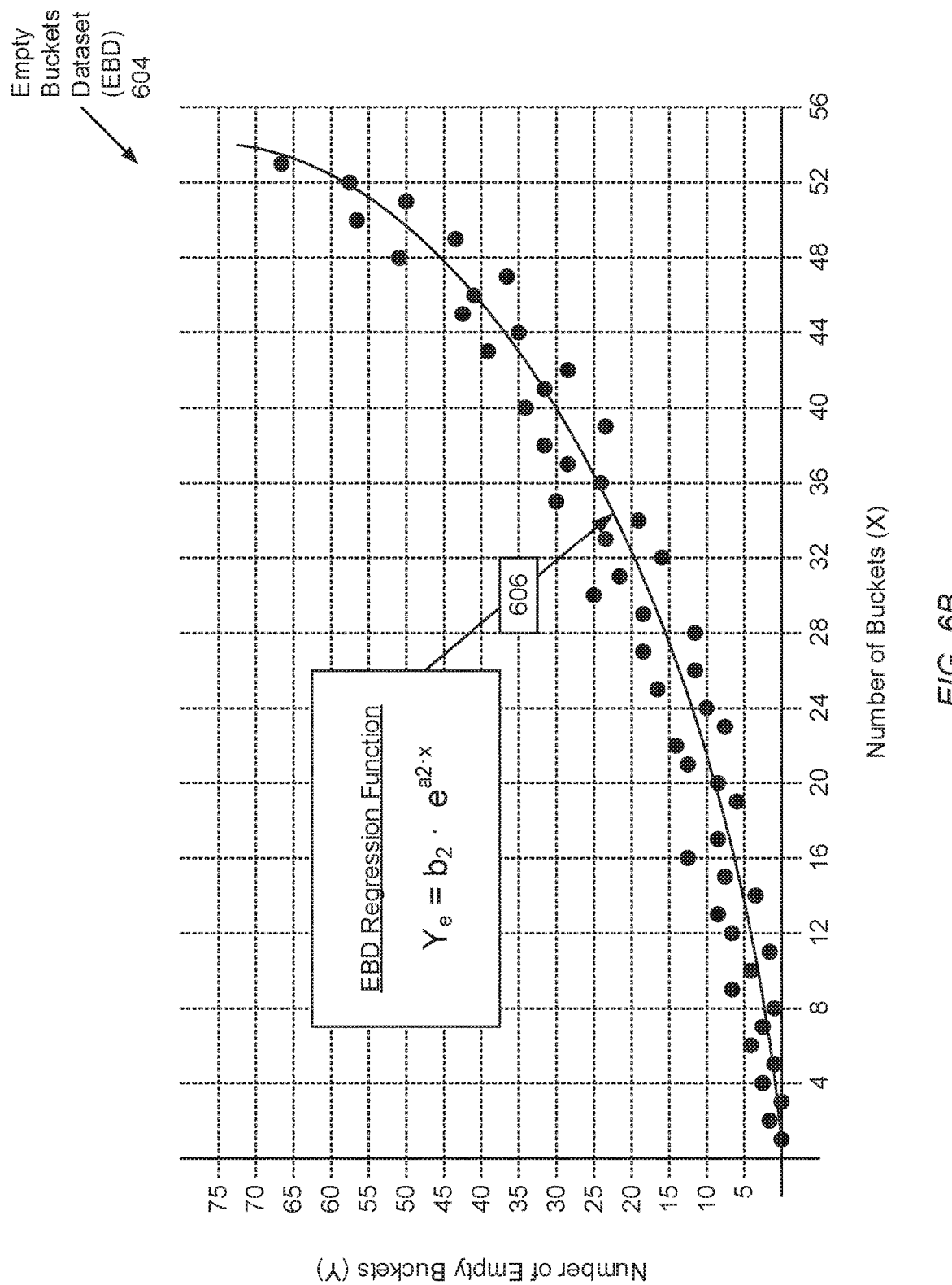
FIG. 6B shows an example empty buckets dataset in accordance with one or more embodiments of the invention.
Figure 6C:
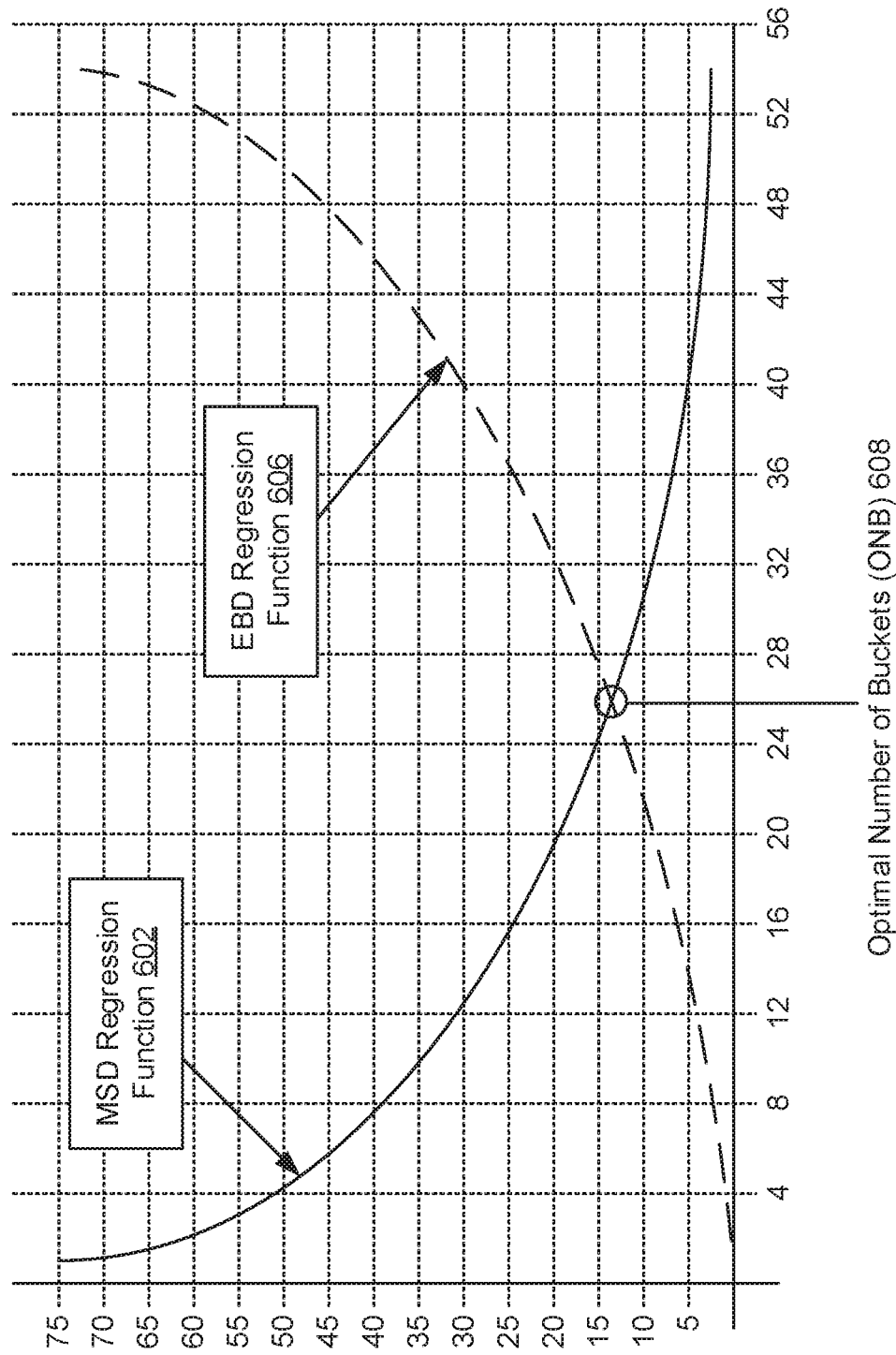
FIG. 6C shows an example optimal number of buckets determination in accordance with one or more embodiments of the invention.

Next, the DEA proceeds to generate an empty buckets dataset (EBD) based on the BL and the distribution of the data values specified in the SD. Each element in the EBD corresponds to a number of buckets value specified in the BL and, further, may be representative of the number of empty buckets (i.e., buckets containing zero data samples) conveyed in a histogram of the SD, where the histogram is defined by the number of buckets value corresponding to the element in the EBD. That is, reconsidering the above-mentioned example where the number of buckets value is four: a revisit of the generated histogram may also show that the number of empty buckets is one. Accordingly, the element in the EBD, which corresponds to the number of buckets value of four, would be set to one (i.e., BL[n]=4;

EBD[n]=1). FIG. 6B shows a graphical representation of an example EBD (604) for all 53 number of bucket values specified in the BL.

Following the generation of the EBD, the DEA determines a best fit function—i.e., an EBD regression function—that is representative of the EBD. For the example EBD (604) depicted in FIG. 6B, the EBD regression function (606) may be an exponential growth function, which may be generally expressed as follows: $Y_E = b_2 \cdot e^{a_2 \cdot X}$, where Y is representative of the number of empty buckets, X is representative of the number of buckets, $b_2$ is an initial value constant, and $a_2$ is the exponential growth factor.

Subsequently, the DEA identifies the point of intersection (see e.g., FIG. 6C) between the MSD regression function (602) and the EBD regression function (606). The value for the independent variable (i.e., number of buckets) at the aforementioned point of intersection (608) is determined to be the ONB. For the purposes of this example, assume the ONB is set at 26 buckets. That is, 26 buckets is the ideal number of buckets such that the distribution of the data values specified in the SD through, for example, a histogram, renders a certain number of empty buckets while maintaining the highest number of samples in any particular bucket above a minimum constant (e.g., one).

Figure 6D:
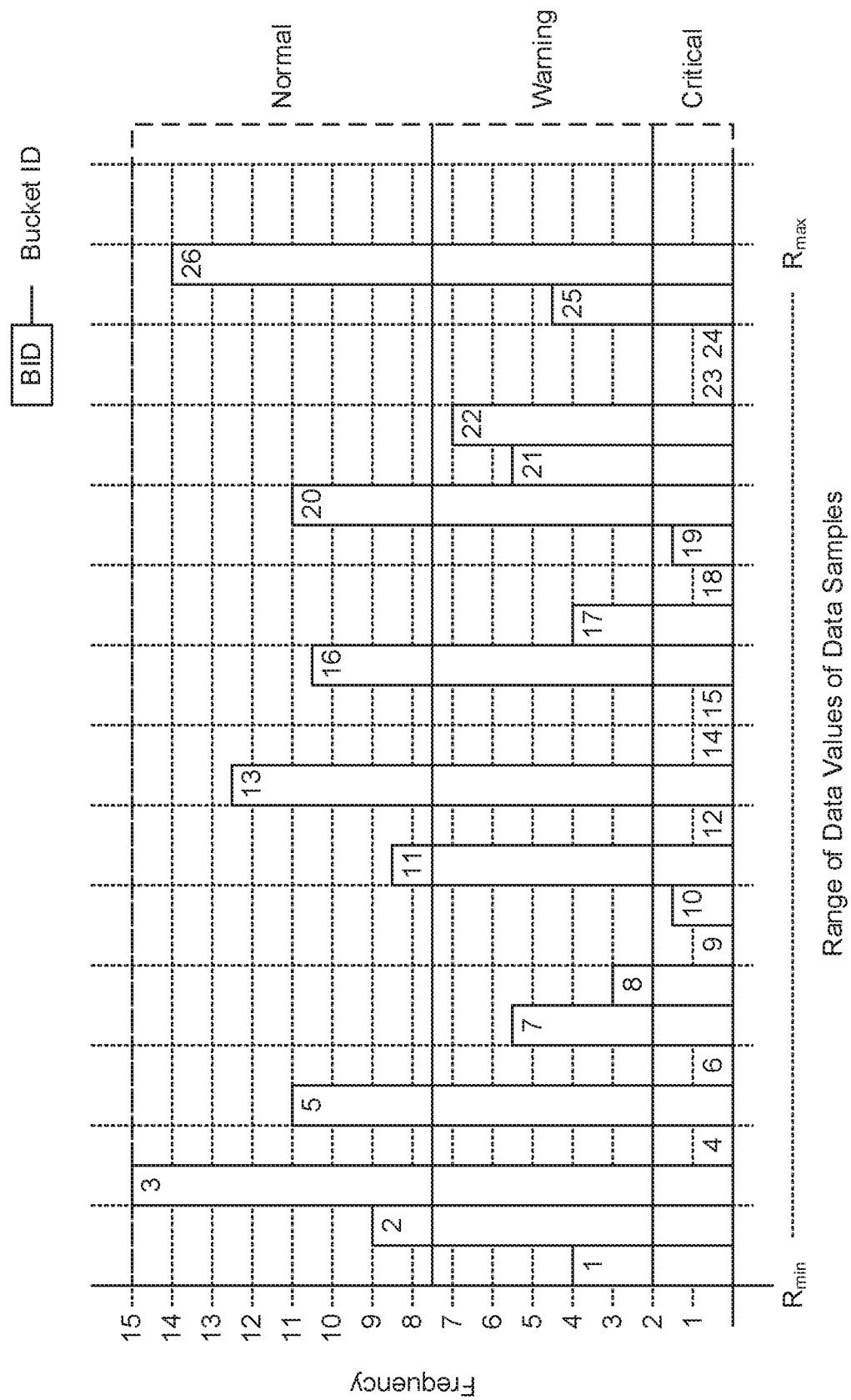
FIG. 6D shows an example graphical representation of a sensor bucket classifier in accordance with one or more embodiments of the invention.

Hereafter, the DEA continues forth with classifying the NDS. First, the DEA generates a histogram of the data samples specified in the SD, where the histogram is defined by the ONB. Next, the DEA obtains class policies (CPs), which when laid over the histogram, generates a sensor-specific data classifier (i.e., a sensor bucket classifier (SBC)) directed to classifying data samples provided by the sensor (i.e., thermocouple). Each CP pertains to a classification and may specify lower and/or upper frequency (i.e., number of data samples) boundaries, which assign buckets confined by those frequency boundaries to the classification. For the purposes of this example, assume three CPs are obtained: (i) a first CP directed to a "normal" classification, which specifies a lower frequency boundary of 7 data samples, therefore indicating that any histogram buckets containing more than 7 data samples may be assigned to the "normal" classification; (ii) a second CP directed to a "warning" classification, which specifies a lower frequency boundary of 2 data samples and an upper frequency boundary of 7 data samples, therefore indicating that any histogram buckets containing more than 2 data samples, up to 7 data samples, may be assigned to the "warning" classification; and (iii) a third CP directed to a "critical" classification, which specifies an upper frequency boundary of 2 data samples, therefore indicating that any histogram buckets containing 2 or less data samples may be assigned to the "critical" classification. FIG. 6D shows a graphical representation of the exemplified SBC portrayed through a 26-bucket histogram overlaid with the above-mentioned CPs.

After generating the SBC, the DEA maps the NDS (i.e., the most recent temperature measurement) into the SBC, thereby identifying into which particular bucket that the NDS falls. In a first scenario, assume the NDS falls into Bucket 5, which is associated with a frequency of 11. Based on the obtained CPs, Bucket 5 is thus directed to the "normal" classification, and consequently, so is the NDS. That is, the temperature measurement representative of the NDS lies within a range of temperature values determined to be normal. Based on this outcome, the DEA may or may not issue an alarm (i.e., a notification or message) to the administrators of the PS (i.e., power generating plant). By way of an example, a forwarded notification/message would inform administrators of the cancellation of an alarm, if one was raised. In a second scenario, assume the NDS falls into Bucket 22, which is associated with a frequency of 7. Based on the obtained CPs, Bucket 22 is thus directed to the "warning" classification, and consequently, so is the NDS. That is, the temperature measurement representative of the NDS lies within a range of temperature values determined to be warnings. Based on this outcome, the DEA may issue an alarm to the administrators of the PS, thus apprising them that the latest measured temperature pertaining to the boiler is slightly outside normal values and an appropriate action or intervention may be required. Alternatively, based on this outcome, the DEA may issue an alarm towards an alarm handling system at the PS, which in response to receiving the alarm, would automatically trigger one or more predefined remediation actions. In a third scenario, assume the NDS falls into Bucket 9, which is associated with a frequency of 1. Based on the obtained CPs, Bucket 9 is thus directed to the "critical" classification, and consequently, so is the NDS. That is, the temperature measurement representative of the NDS lies within a range of temperature values determined to be critical. Based on this outcome, the DEA may issue an alarm to the administrators of the PS, thus apprising them that the latest measured temperature pertaining to the boiler is well outside normal values and appropriate actions/intervention is required.

Embodiments of the invention relate to a method and system for implementing histogram-based alarms through number of buckets optimization. The selection of how many intervals or buckets to employ as a constraint for representing the distribution of data may have a significant impact on the quality of the data distribution results. The quality of the data distribution results, in turn, impact the sensitivity and accurateness of any intelligence (e.g., data classification) produced therefrom. For example, when the number of intervals/buckets is too low, the low granularity may cause some data anomalies to be overlooked while causing some normal data samples to induce false alarms. On the other hand, by way of another example, when the number of intervals/buckets is too high, the high granularity may cause a substantial number of intervals/buckets to contain a low number of data samples, thereby skewing the classification of those data samples and raising the occurrences of false alarms as well. Accordingly, number of buckets optimization is an imperative prerequisite for intelligence (e.g., data classification) development.

Embodiments of the invention relate to implementing histogram-based alarms in production systems. Specifically, one or more embodiments of the invention address the problem of incorrect data classification and false alarms. That is, in modern production systems, software, rather than human operators, substantively oversee the systems' monitoring and remediation functions. Further, though human intervention might be involved in some critical scenarios, in other scenarios (e.g., systems or processes in space, deep sea, or remote environments), humans are not present at all. In these circumstances, the responsibility of restoring the production system to its expected parameters depends solely on the software-based monitoring and remediation subsystems, which act on any issued alarms. This dependence raises the importance of the accuracy of event classifications. That is, both undetected warning or critical conditions (i.e., representative of false negatives), as well as the classification of normal conditions as warning or critical conditions (i.e., representative of false positives), may lead to incorrect remediation action that is not needed, or alternatively, may lead to the lack of an appropriate remediation action when it is needed. Consequently, based on these false negatives and/or false positives, the production system may be damaged or, worse yet, destroyed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing distribution-based data classification, comprising:
   receiving a new data sample (NDS) and a sensor identifier (SID);
   obtaining a sampled dataset (SD) associated with the SID;
   determining an optimal number of buckets (ONB) for the SD;
   generating a distribution diagram (DD) representative of the SD using the ONB;
   generating a sensor bucket classifier (SBC) by applying at least one class policy (CP) to the DD;
   determining a classification for the NDS using the SBC; and
   issuing an alarm appropriate to the classification,
   wherein determining the ONB for the SD, comprises:
     selecting a bucket list (BL) based on a cardinality of the SD;
     generating a maximum samples dataset (MSD) using the BL;
     deriving a first set of regression function parameters (RFPs) representative of the MSD;
     generating an empty buckets dataset (EBD) using the BL;
     deriving a second set of RFPs representative of the EBD; and
     determining the ONB based on the first set of RFPs and the second set of RFPs.

2. The method of claim 1, wherein generating the MSD using the BL, comprises:
   for each number of buckets specified in the BL:
     generating a histogram representative of the SD, wherein the histogram comprises a set of buckets, wherein a cardinality of the set of buckets equals the number of buckets;
     identifying a bucket of the set of buckets associated with a highest frequency; and
     setting the highest frequency as an element of the MSD that corresponds to the number of buckets.

3. The method of claim 1, wherein generating the EBD using the BL, comprises:
   for each number of buckets specified in the BL:
     generating a histogram representative of the SD, wherein the histogram comprises a set of buckets, wherein a cardinality of the set of buckets equals the number of buckets;
     identifying a subset of the set of buckets associated with a frequency of zero; and
     setting a cardinality of the subset of the set of buckets as an element of the EBD that corresponds to the number of buckets.

4. The method of claim 1, wherein the first set of RFPs comprises arguments to one selected from a group consisting of a linear regression function and an exponential decay regression function.

5. The method of claim 1, wherein the second set of RFPs comprises arguments to one selected from a group consisting of a linear regression function and an exponential growth regression function.

6. The method of claim 1, wherein the ONB relates to a point of intersection between a first regression function best fitting the MSD and a second regression function best fitting the EBD.

7. The method of claim 1, wherein the DD is a histogram, wherein the histogram comprises a set of buckets, wherein a cardinality of the set of buckets equals the ONB.

8. The method of claim 1, wherein the classification is one selected from a group consisting of a normal classification, a warning classification, and a critical classification.

9. A system, comprising:
   a computer processor;
   a data classifier (DC) executing on the computer processor, and programmed to:
     receive a new data sample (NDS) and a sensor identifier (SID);
     obtain a sampled dataset (SD) associated with the SID;
     obtain an optimal number of buckets (ONB) for the SD from a bucket optimizer (BO), wherein determining the ONB for the SD, comprises:
       selecting a bucket list (BL) based on a cardinality of the SD;
       generating a maximum samples dataset (MSD) using the BL;
       deriving a first set of regression function parameters (RFPs) representative of the MSD;
       generating an empty buckets dataset (EBD) using the BL;
       deriving a second set of RFPs representative of the EBD; and
       determining the ONB based on the first set of RFPs and the second set of RFPs;
     generate a distribution diagram (DD) representative of the SD using the ONB;
     generate a sensor bucket classifier (SBC) by applying at least one class policy (CP) to the DD; and
     determine a classification for the NDS using the SBC,
   a sensor operatively connected to the computer processor and programmed to monitor a portion of a production system (PS), wherein the sensor is one selected from a group consisting of a physical sensor mounted on the PS and a logical sensor executing on the PS, and
   an alarm generator (AG) executing on the computer processor and operatively connected to the DC, wherein the AG is programmed to issue an alarm appropriate to the classification.

10. The system of claim 9, wherein after the alarm is issued, the PS is programmed to:
    receive the alarm, wherein the alarm comprises the SID and a class label associated with the classification;
    identify the sensor as being associated with the SID;
    determine that the sensor is responsible for monitoring the portion of the PS; and
    adjust, based on the class label, a factor that controls the portion of the PS.

11. The system of claim 9, further comprising:
    an analysis system (AS) comprising the computer processor and a data evaluation agent (DEA) executing thereon,
    wherein the DEA comprises the DC, the BO, and the AG.

12. The system of claim 10, further comprising:
    a sensor operatively connected to the AS and programmed to monitor a portion of a production system (PS), wherein the sensor is one selected from a group consisting of a physical sensor mounted on the PS and a logical sensor executing on the PS.

13. A non-transitory computer readable medium (CRM) comprising computer readable program code, which when executed by a computer processor, enables the computer processor to:
   receive a new data sample (NDS) and a sensor identifier (SID);
   obtain a sampled dataset (SD) associated with the SID;
   determine an optimal number of buckets (ONB) for the SD;
   generate a distribution diagram (DD) representative of the SD using the ONB;
   generate a sensor bucket classifier (SBC) by applying at least one class policy (CP) to the DD;
   determine a classification for the NDS using the SBC; and
   issue an alarm appropriate to the classifications:
   wherein to determine the ONB, the computer readable program code, which when executed by the computer processor, enables the computer processor to:
     select a bucket list (BL) based on a cardinality of the SD;
     generate a maximum samples dataset (MSD) using the BL;
     derive a first set of regression function parameters (RFPs) representative of the MSD;
     generate an empty buckets dataset (EBD) using the BL;
     derive a second set of RFPs representative of the EBD; and
     determine the ONB based on the first set of RFPs and the second set of RFPs.

14. The non-transitory CRM of claim 13, wherein to generate the MSD, further comprises computer readable program code, which when executed by the computer processor, enables the computer processor to:
   for each number of buckets specified in the BL:
     generate a histogram representative of the SD, wherein the histogram comprises a set of buckets, wherein a cardinality of the set of buckets equals the number of buckets;
     identify a bucket of the set of buckets associated with a highest frequency; and
     set the highest frequency as an element of the MSD that corresponds to the number of buckets.

15. The non-transitory CRM of claim 13, wherein to generate the EBD, further comprises computer readable program code, which when executed by the computer processor, enables the computer processor to:
   for each number of buckets specified in the BL:
     generate a histogram representative of the SD, wherein the histogram comprises a set of buckets, wherein a cardinality of the set of buckets equals the number of buckets;
     identify a subset of the set of buckets associated with a frequency of zero; and
     set a cardinality of the subset of the set of buckets as an element of the EBD that corresponds to the number of buckets.

16. The non-transitory CRM of claim 13, wherein the ONB relates to a point of intersection between a first regression function best fitting the MSD and a second regression function best fitting the EBD.

17. The non-transitory CRM of claim 13, wherein the DD is a histogram, wherein the histogram comprises a set of buckets, wherein a cardinality of the set of buckets equals the ONB.

* * * * *